T. W. GRAY.
WATER ELEVATING APPARATUS.
APPLICATION FILED DEC. 27, 1910.
1,000,169.
Patented Aug. 8, 1911.
2 SHEETS—SHEET 2.
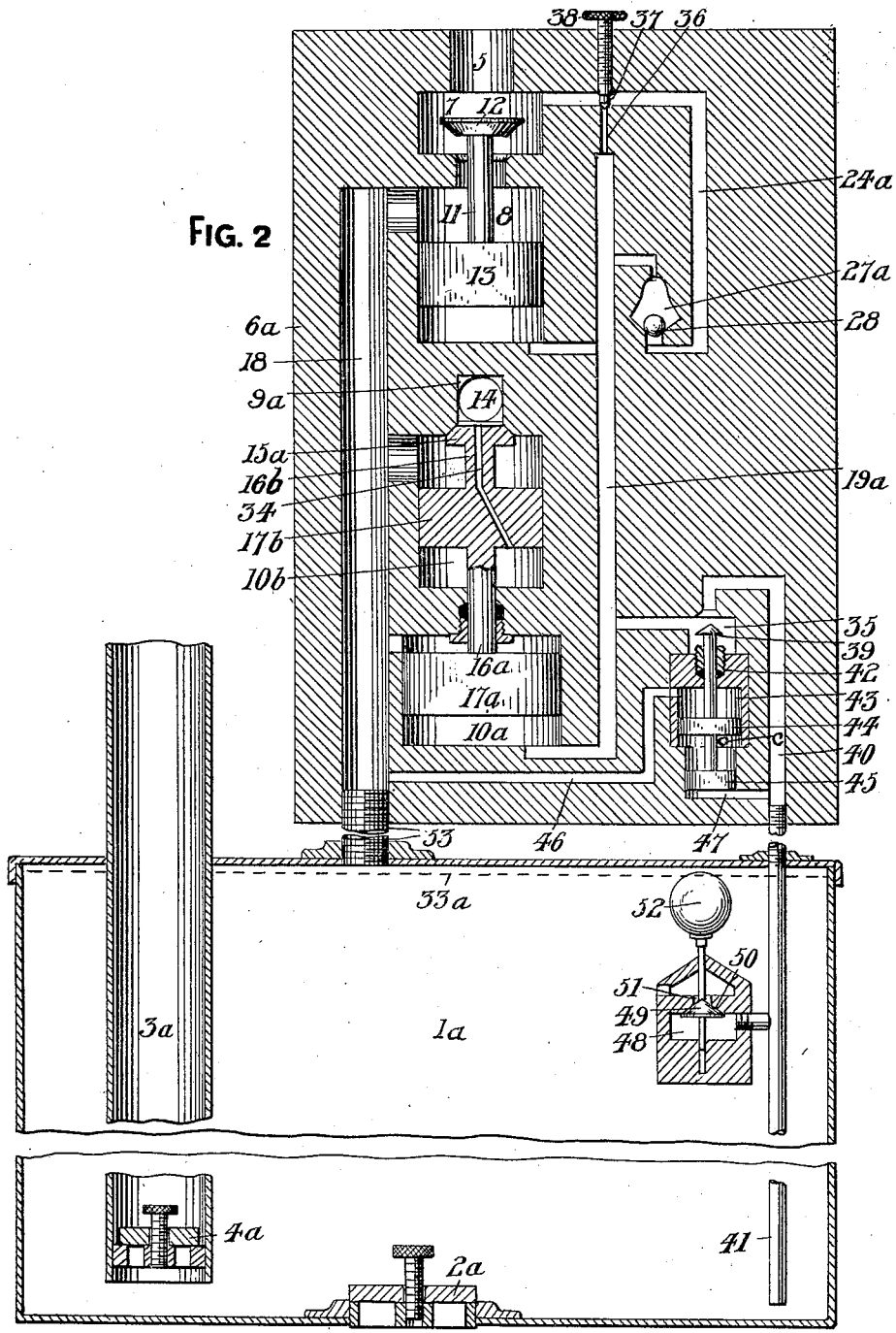
WITNESSES
INVENTOR
T. W. Gray,
by F. N. Barber,
attorney.

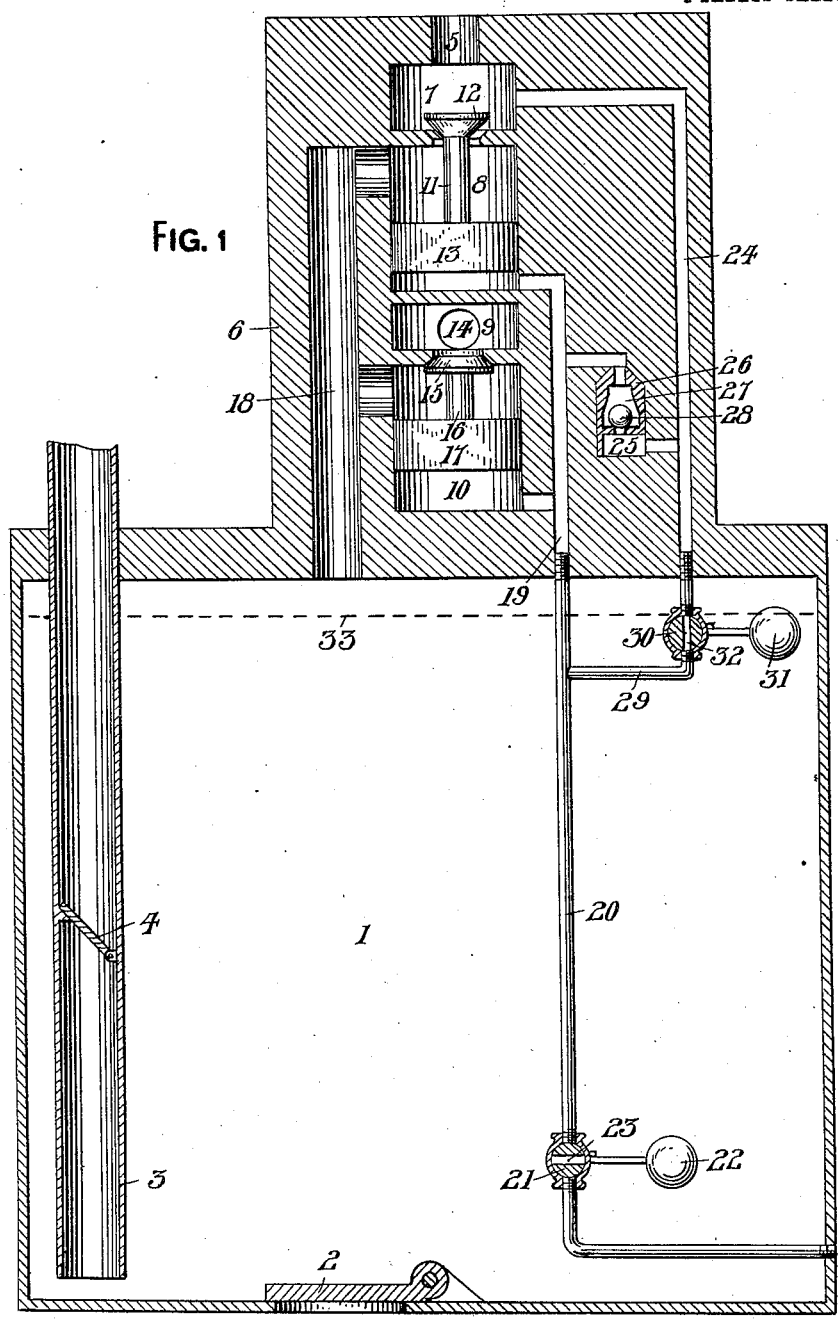

UNITED STATES PATENT OFFICE.

THOMAS W. GRAY, OF WOODVILLE, PENNSYLVANIA.

WATER-ELEVATING APPARATUS.

1,000,169.  Specification of Letters Patent.  Patented Aug. 8, 1911.

Application filed December 27, 1910. Serial No. 599,510.

*To all whom it may concern:*

Be it known that I, THOMAS W. GRAY, a citizen of the United States, residing at Woodville, in the county of Allegheny and State of Pennsylvania, have invented new and useful Improvements in Water-Elevating Apparatus, of which the following is a specification.

My invention relates to apparatus for elevating water by the use of steam or compressed air. The objects thereof are to simplify and modify existing structures so as to effect a great saving in their cost and to secure greater efficiency.

Referring to the accompanying drawings, Figure 1 is a vertical section of one form of my invention and Fig. 2 is a vertical section of a second form thereof.

Referring first to Fig. 1, 1 is a tank or chamber having in its bottom the inwardly-opening inlet or foot valve 2 and the vertical outlet pipe 3 extending through the top of the chamber nearly to the bottom thereof and provided with the upwardly-opening check valve 4. The pipe 3 fits air-tight in the top of the chamber 1. 5 is the compressed air or steam inlet or conduit which is located at the top of the housing 6 on the top of the chamber 1. The inlet 5 opens into the chamber 7 which is one of a vertical series of auxiliary chambers in the housing 6. The other auxiliary chambers are marked 8, 9, and 10. The chamber 7 communicates with the chamber 8 by means of a central opening in which the stem 11 of the valve 12 reciprocates, the valve being provided with a seat in the bottom of the chamber 7. The lower end of the stem 11 is provided with the plunger 13 in the chamber 8, the plunger having a larger cross-area than the valve 12. The chamber 9 has no direct communication with the chamber 8. It has the exhaust or air-outlet 14 opening into the atmosphere. The chamber 10 has in its upper end the valve 15 adapted to a seat in an opening leading to the chamber 9. The valve 15 is on the upper end of the stem 16 provided on its lower end with the plunger 17 having a larger cross-area than that of the valve 15. In the housing 6 I provide a vertical passage 18 leading from the chamber 1 and provided with an upper branch opening into the chamber 8 above the plunger 13, and a lower branch opening into the chamber 10 above the plunger 17. In the housing 6 I provide also the passage 19 having an upper branch opening into the chamber 8 below the plunger 13, and a lower branch opening into the chamber 10 below the plunger 17. The lower end of the passage 19 receives the upper end of the air-pipe 20 which has its lower end secured water and air-tight in the side of the chamber 1 near the bottom thereof. The lower end of the pipe 20 opens into the atmosphere and has near the bottom of the chamber 1 the rotary valve 21 provided with the float 22. The passage 23 in the valve is arranged to interrupt the passage of air through the pipe 20 when the float is raised to a horizontal position, and to permit the air in the passage 19 to exhaust through the pipe 20 when the float is lowered. The housing 6 is provided with a passage 24 having an upper branch leading to the chamber 7 and a lower branch leading to the bottom of the chamber 25 in the said housing, the upper end of the chamber 25 communicating with the passage 19. Within the chamber 25 is the valve casing 26 having therein the valve chamber 27 in which the ball-valve 28 is located. The ball 28 is shown seated over an opening leading into the bottom of the chamber 25. The ball 28 will, when a strong current of air passes from the chamber 25 to the passage 19, be lifted and held so as to cut off the flow of air into the passage 19. The bottom of the passage 24 is connected to the pipe 20 by the pipe 29, in which I locate the valve 30 provided with the float 31, the passage 32 in the valve being arranged to permit the passage of air through the pipe 29 when the float is raised and to prevent the passage of air through the pipe 29 when the float is lowered.

The parts are in the position assumed immediately after the water has risen to the water line 33 and raised the float 31. Just prior to this the valve 15 was lowered so as to be off its seat, the valve 12 was lowered so as to be on its seat, and the ball-valve 28 was raised to close its upper seat. As soon as the float 31 rotated the valve 30 so as to permit the compressed air in the passage 24 to pass through the pipe 29, and into the pipe 20 and the passage 19, the pressure on the ball-valve was equalized, permitting it to fall to the position shown. The air pressure in the pipe 19 was transmitted to the chambers 8 and 10 causing the valve 12 to be unseated and the valve 15 to be seated, whereby compressed air from the inlet 5 passes through the chamber 8 and the passage 18 into contact with the water in the chamber 1. The compressed air on the top of the water forces the water up the outlet pipe 3 to any desired place of deposit. The float 31 soon falls and closes the valve 30. When the water level sinks so as to cause the float 22 to fall, the air in the passage 19 and the pipe 20 may escape through the pipe 20 into the atmosphere. The rush of air from the passage 24 and the chamber 25 past the ball valve 28 lifts the latter to its upper seat and prevents the flow of compressed air into the passage 19. As the air in the chambers 8 and 10 below the plungers 13 and 17 is reduced to atmospheric pressure, the pressure of the compressed air on the tops of these plungers lowers the same causing the valve 12 to be closed and the valve 15 to be opened. thus cutting off the compressed air from the chamber 1 and placing the latter in communication with the atmosphere through the passage 18, the chambers 10 and 8. and the outlet 14. Water now lifts the valve 2 and soon closes the valve 21 and finally opens the valve 30, whereupon the described operation is repeated.

Referring now to Fig. 2, $1^a$ is the water chamber provided with the water outlet $3^a$ in which I place the check valve $4^a$. $2^a$ is the water inlet valve in the bottom of the chamber $1^a$. 5 is the inlet for compressed air or steam, opening into the chamber 7, which is one of a vertical series of chambers in the housing $6^a$, the other chambers being marked 8, $9^a$, $10^b$, and $10^a$. In the chamber $10^b$ is the plunger $17^b$ bearing at its top the valve $15^a$, adapted, when closed, to prevent the passage of air into the exhaust chamber $9^a$. The plunger $17^b$ and the valve $15^a$ are provided with a passage 34 connecting the exhaust chamber $9^a$ to the chamber $10^b$ below the plunger $17^b$. The chamber $10^a$ contains the plunger $17^a$ which is connected by the stem $16^a$ to the plunger $17^b$, the stem $16^a$ working through a stuffing box in the partition between the chambers $10^a$ and $10^b$. The passage $19^a$ in the housing $6^a$ has branches opening into the chambers 8 and $10^a$ below the plungers 13 and $17^a$, and into the valve chambers $27^a$ and 35. The chamber $27^a$ is provided with the ball-valve 28 adapted to close the passage of air to the passage $19^a$. The passage $24^a$ leads from the chamber 7 to the chamber $27^a$ below the ball 28. A passage 36 connects the passages $19^a$ and $24^a$, the passage 36 being regulated by the needle valve 37, operated by the thumb-piece 38. The chamber 35 has at its top a valve seat for the vertical valve 39, which controls the air passage 40 leading from the chamber 35 to the pipe 41, extending air-tight through the top of the chamber $1^a$ nearly to the bottom thereof. The stem of the valve 39 extends through a stuffing-box 42 into the chamber 43 where the stem is provided with the plunger 44. The lower part of the chamber 43 is reduced in size and contains a plunger 45 connected rigidly to the plunger 44. A passage 46 connects the passage 18 to the chamber 43 above the plunger 44 and a passage 47 connects the passage 40 to the chamber 43 below the plunger 45. Within the chamber $1^a$ and near the top thereof is the valve chamber 48 connected below the valve 49 with the pipe 41. The valve 49 closes upwardly on its seat 50 to prevent the escape of air through the outlet 51 into the chamber $1^a$. The float 52 attached to the valve stem causes the valve 49 to be seated when the water reaches a certain level, as $33^a$. The passage 18 is connected to the chamber $1^a$ by the pipe 53.

The chamber $1^a$ being filled to the level $33^a$, closes the valve 49, at which time the valve 12 is closed, the valve $15^a$ is open, and the ball valve 28 is at its upper position preventing air from passing to the passage $19^a$. The valve 37 is regulated so as to permit a small amount of compressed air to pass into the passage $19^a$. When the valve 49 closes, the air passing the valve 37 cannot escape, the head of water in the chamber $1^a$ being too great to permit the air to pass out through the lower end of the pipe 41 into the chamber $1^a$. The density of the air in the passages $19^a$, 40 and 47 increases, first, so as to force up the plunger 45 and close the valve 39, making it impossible for the air to force its way out through the pipe 41 as the density of the air in the passage $19^a$ rises. Finally, the pressure of the air in the passage $19^a$ increases to such a degree as to force up the valves 12 and $15^a$, thereby opening the passage 18 to the compressed air inlet 5 and cutting off the passage $19^a$ from the exhaust passage 14. The equalizing of the pressures on opposite sides of the ball valve 28 permits it to fall. Compressed air being now allowed to pass the valve 12 enters the chamber $1^a$ and forces the water up the outlet pipe $3^a$. The compressed air enters also the passage 46 and the chamber 43 and pushes the plunger 44 downwardly, thereby unseating the valve 39 which permits the air to enter the chamber 48 and hold the valve 49 on its seat. The pressure in the chamber 48 is greater than in the passage 18 and on the water in the chamber 1ª due to friction and the head of water above the chamber 48. This difference of pressure holds the float valve 49 closed after the water level has passed below the float. When the water level nears the bottom of the chamber 1ª so as to reduce the head of water over the end of the pipe 41 to a sufficient extent, air escapes from the lower end of the pipe 41 into the chamber 1ª. The escape from the pipe 41 increases as the water level lowers until the air flowing past the valve 28 carries it to its upper seat and closes the main passage 24ª of compressed air to the passage 19ª. The pressure in the pipe 41 and in the chamber become so nearly equal that the valve 49 drops and permits the air passing the valve 37 to escape into the chamber 1ª. The pressure in the passages 18 and 19ª now becomes equal, the inrushing air forces the valve 12 down permitting the access of compressed air to the passage 18. Pressure densities on opposite sides of the plunger 17ª are equal, but on opposite sides of the plunger 17ᵇ unequal. Accordingly, the valve 15ª is forced down opening the passage 18 to the atmosphere at the outlet 14. The check valve 4ª prevents the water in the pipe 3ª from flowing into the chamber 1ª. Water lifts the check valve 2ª and rises in the chamber 1ª until the float 52 closes the valve 49 when the operation described is repeated.

The appended claims mention certain differential valves which must be understood to embrace not only the valves proper but also their connected stems and plungers.

Though I have described my invention for a specific purpose, it is clear that it may be used with steam pressure in connection with steam traps and other devices.

I do not limit myself to the precise details and combinations set forth as the same may be varied without departing from the spirit of my invention.

I claim—

1. In a liquid-lifting apparatus controlled by a supply of compressed fluid, a liquid-holding chamber, an outlet pipe therefor, an inlet valve-seat between the compressed-fluid supply and the chamber, a valve actuated by differential pressure and seating in the direction of the flow of fluid through the seat and having its smaller area in contact with the fluid, an exhaust valve-seat for the said chamber, a valve therefor actuated by differential pressure and seating in the direction of the flow of the exhaust fluid from the chamber through the said exhaust valve-seat, a passage leading the compressed-fluid supply to the larger areas of the said valves, and means controlled by the liquid-level in the chamber for exhausting the pressure on the said larger areas of the valves when the liquid is at a minimum low level and for closing the said fluid exhausting means when the liquid is at a maximum higher level.

2. In a liquid-lifting apparatus controlled by a supply of compressed fluid, a liquid-holding chamber, an outlet pipe therefor, inlet and exhaust valves actuated by differential pressure to control the supply of the compressed fluid to the chamber and the exhaust of the said fluid therefrom, a passage leading from the said compressed fluid to larger areas of the valves to open the former and close the latter, means controlled by a low level of the liquid in the chamber to relieve the pressure from the said areas, and a check-valve in the said passage to cut down the pressure supply to the said areas when pressure is relieved therefrom.

3. In a liquid-lifting apparatus controlled by a supply of compressed fluid, a liquid-holding chamber, an outlet pipe therefor, an exhaust valve actuated by differential pressure to control the supply of the compressed fluid to the chamber and the exhaust of the said fluid therefrom, a passage leading from the said compressed fluid to larger areas of the valves to open the former and close the latter, means controlled by a low level of the liquid in the chamber to relieve the pressure from the said areas, a check-valve in the said passage to cut down the pressure to the said areas when pressure is relieved therefrom, a by-pass around the check valve, and means for governing the passage of fluid through the by-pass.

4. In a liquid-lifting apparatus, a liquid-holding chamber, an outlet pipe connected thereto, two differential valves controlling respectively the entrance of compressed gas to the chamber and the exhaust of gas therefrom, means connecting the inlet and exhaust openings controlled by the valves with the chamber, passages connected with the compressed-gas supply to maintain the inlet-valve open and the exhaust-valve closed, an exhaust-valve controlled by the minimum level of liquid in the chamber, connections from the latter valve to the said passages, and a check valve to cut off the supply of compressed gas to said passages when the last named exhaust valve is opened.

5. In a liquid-lifting apparatus controlled by a supply of compressed fluid, a pair of inlet and exhaust valves actuated by differential pressure, a liquid-holding chamber connected to openings controlled by the valves, an exhaust passage in communication with the larger areas of the valves, a float valve connected to the passage and opened by a low level of the liquid to exhaust the pressure against the said larger areas of the valves, a passage connecting the fluid pressure to the exhaust passage, and a check-valve seated by the rush of compressed fluid to the said larger areas of the said pair of inlet and exhaust valves, the said exhaust passage being closed by a higher level of the fluid to equalize the pressure on the check valve.

Signed at Pittsburg, Pa., this 22nd day of December, A. D. 1910.

THOMAS W. GRAY.

Witnesses:
F. N. BARBER,
ELVA STANICH.

Copies of this patent may be obtained for five cents each, by addressing the "Commissioner of Patents, Washington, D. C."